Oct. 30, 1934.  H. W. DUDLEY  1,978,418
CONCENTRIC RETURN MULTICONDUCTOR CABLE
Filed Oct. 8, 1930   3 Sheets-Sheet 1

INVENTOR
H. W. DUDLEY
BY
J. W. Schmied
ATTORNEY

Patented Oct. 30, 1934

1,978,418

UNITED STATES PATENT OFFICE 1,978,418

CONCENTRIC RETURN MULTICONDUCTOR CABLE

Homer W. Dudley, East Orange, N. J., assignor to Bell Telephone Laboratories, Incorporated, New York, N. Y., a corporation of New York Application October 8, 1930, Serial No. 487,153

7 Claims. (Cl. 173—265)

This invention relates to electric cable construction and more particularly to multi-conductor cables adapted for the transmission of intelligence.

An object of this invention is to provide a multi-conductor cable in which each pair of conductors is capable of transmitting with small attenuation a band of frequencies whose upper limit extends well above the frequencies now employed in carrier transmission.

Modern developments in the art of communication render it highly desirable to have available for transmission purposes a conductor system which will transmit, without undue attenuation, waves of frequencies extending from the audio frequency range well up into the radio frequency range. At the same time, the system must be such that there is negligible trouble from noise and cross-talk, due to the relative position of conductors in the same cable.

These advantages are obtained in a cable constructed in accordance with the principles underlying the present invention.

Broadly, this invention comprises a cable containing a plurality of pairs of coaxial conductors. Each pair of coaxial conductors comprises an outer cylindrical conducting shell containing therein, in spaced relation, an inner conducting tube of much smaller diameter, one acting as the return for the other. The two conductors of each pair are insulated from each other and held in proper concentric relation by means of spaced washers or some suitable dielectric of low dielectric constant and low conductance so as to introduce minimum leakage loss between the conductors. This dielectric requirement is met by having air or other gas as the effective dielectric. An evacuated space might also be used as the dielectric.

This form of construction for the coaxial conductors is such that interference from nearby circuits and noise coming from external sources will be practically negligible. Moreover, the nature of the circuit is such that even though the outer conductors of each pair of coaxial conductors be grounded, it will not be subject to interference from ground current. Suitable types of coaxial conductors which may be utilized in accordance with the present invention are disclosed in U. S. Patent No. 1,781,092, issued November 11, 1930 to H. A. Affel and E. I. Green, Patent No. 1,781,124 issued November 11, 1930 to H. R. Nein and Patent No. 1,873,477 issued August 23, 1932 to D. A. Quarles.

Referring to the drawings.

Figure 1:
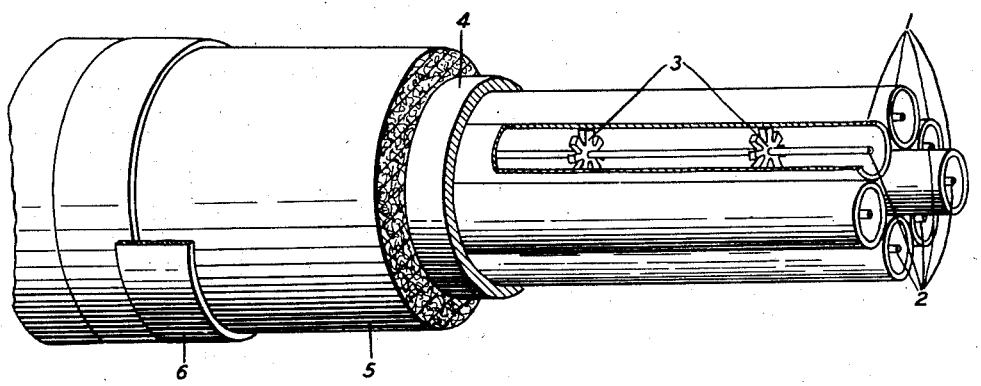
Fig. 1 shows a cable constructed in accordance with this invention and having certain portions thereof partly broken away.

In Fig. 1, which is the preferred form of this invention, the outer conductors 1 of each pair of coaxial conductors in the cable are tubes with external diameters of about ¼ to ½ inch (.63 cm. to 1.27 cm.) and having a wall thickness of approximately .008 inch (.02 cm.). It is understood, of course, that for greater mechanical strength or for better shielding, or for other reasons a thicker or thinner wall may be desirable. These particular dimensions are mentioned to indicate in a rough way the size of conductors contemplated for use. The outer conductors 1 are shown as solid tubular conductors. The outer conductors may be in direct contact. They may be made up of strands, ribbons of copper, or of braided wire or ribbon wire construction. This will be described subsequently. Mounted in spaced relation to the outer conductors 1 are inner conductors 2 which may have a construction identical with that of the outer conductors. The inner conductor may be solid, stranded or hollow. If a tubular construction is desired, a braided wire or ribbon structure may be used. Separating the outer conductors from the inner conductors and holding them in proper concentric relation are spacers 3 of some suitable dielectric of small loss angle and low dielectric constant so as to introduce minimum leakage loss and minimum capacity between the conductors. By spacing the washers relatively far apart the principal part of the dielectric between the two washers will be air which as is well known possesses a small dielectric constant and involves substantially no leakage loss. To further reduce the leakage loss due to the washers they may be provided with slots so that the washers are roughly shaped like the hub and spokes of a wheel thereby increasing the amount of air dielectric between the conductors. If desired, the dielectric requirements can be met by having a gas other than air as the effective dielectric. A vacuum might also be used. Spacers such as glazed porcelain, hard rubber, glass or quartz beads, the spacing of which would be sufficiently close to give the desired support, may be used. An effective insulation can be obtained with a spiral string of paper or other suitable material.

Surrounding the outer conductors is an overall lead covering 4 which may be extruded over the entire cable for mechanical reasons. External of the lead covering and resting on a jute bedding 5 is an additional armor covering 6 wound around the cable. It is to be understood, of course, that the lead and armor covering may be used independently of each other or that both may be left off the cable entirely, if considered necessary. A water-proof covering may be extruded over the cable to exclude moisture and dirt. Although no external covering is required for purposes of insulation it may be desirable to provide a covering for the outer conductors of each pair of coaxial conductors to keep moisture and dirt from the insulators separating the outer and inner conductors.

Figure 2:
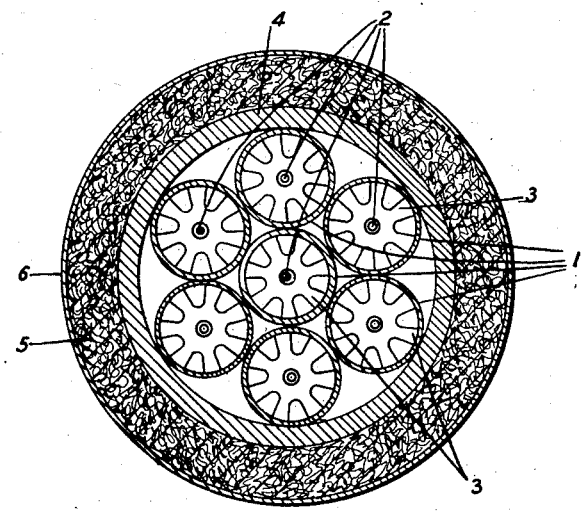
Fig. 2 is a cross-sectional view of Fig. 1.

Fig. 2 is a cross-sectional view of the cable of Fig. 1. Each feature of the cable of Fig. 2 is designated with a reference numeral indentical with that of Fig. 1.

Figure 3:
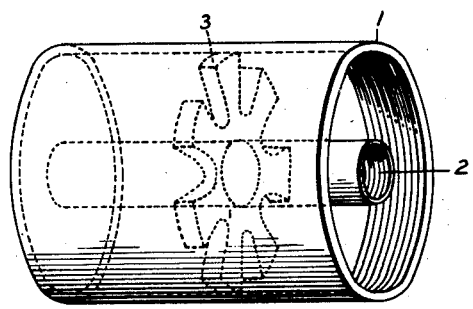
Fig. 3 is an enlarged view of a single pair of the coaxial conductors which go to make up the cable illustrated in Fig. 1.
Figure 4:
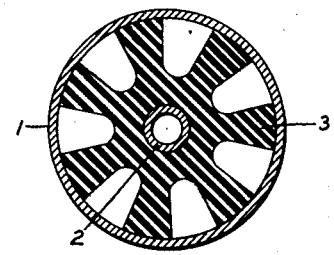
Fig. 4 is a cross-sectional view of Fig. 3.

Fig. 3 is an enlarged view of a single pair of the coaxial conductors of the cable illustrated in Fig. 1. Inner conductor 2 is shown as a solid tubular conductor separated from outer conductor 1 by slotted washer 3. Fig. 4 is a cross-sectional view of Fig. 3.

Figure 6:
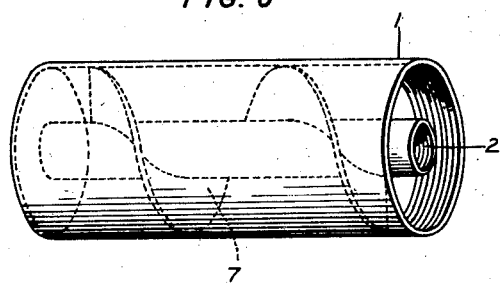
Figs. 5 and 6 are views illustrating a fibre ribbon support for holding a pair of coaxial conductors in spaced relation to each other.
Figure 5:
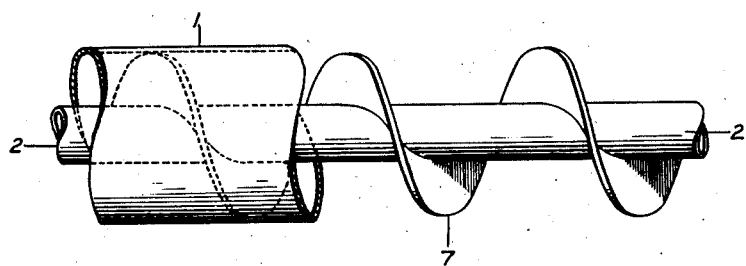

Fig. 5 shows a pair of coaxial conductors in partial section which may be used in a cable constructed in accordance with this invention. The conductors 1 and 2 of the pair are held in spaced relation to each other by a spiral ribbon 7. This ribbon may be of rubber or other material suitable as a dielectric. In Fig. 6 is shown another view of the coaxial conductor arrangement illustrated in Fig. 5.

Figure 7:
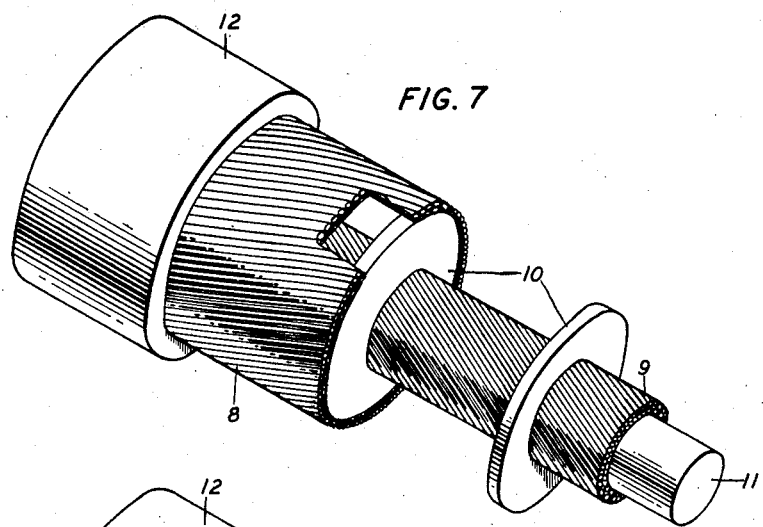
Figs. 7, 8 and 9 are perspective views in partial section of various modifications of the coaxial conductor arrangement.

Referring to Fig. 7 of the drawings, an outer stranded conductor 8 is associated with an inner stranded conductor 9, and provided with a plurality of spaced washers 10 for separating the two conductors, a core 11 upon which the inner conductor is mounted, and a water-proof covering 12 for encasing the pair of conductors. In this figure the conductors are shown as stranded, each conductor having two layers of strands. It is understood, of course, that only one layer, or as many layers as are considered desirable may be used. The layers of strands are so arranged that there are as many layers twisting to the left as to the right, each layer having the same degree of twist. These layers form a thin conducting tube and may be braided or reentrant. By reentrant is meant a construction formed by twisting several strands together to form a wire which is again twisted with other wires in turn formed by twisting other strands together. The water-proof covering 12 which surrounds the outer conductor may be of any known type used to keep moisture and dirt from the insulators, so that the leakage loss will not increase or change with time. This covering may be omitted if desired.

Figure 8:
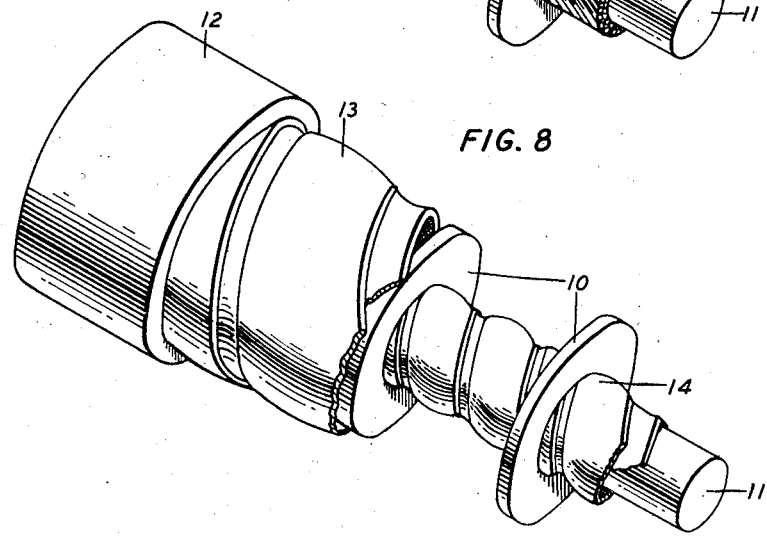

The modification disclosed in Fig. 8 of the drawings includes an outer ribbon conductor 13, an inner ribbon conductor 14, a plurality of spaced washers 10 separating the conductors, a core 11 upon which the inner conductor is mounted, and a water-proof overall covering 12 for encasing the pair of conductors. This construction is similar to that of Fig. 7 except that the conductors are of ribbon form instead of stranded.

Figure 9:
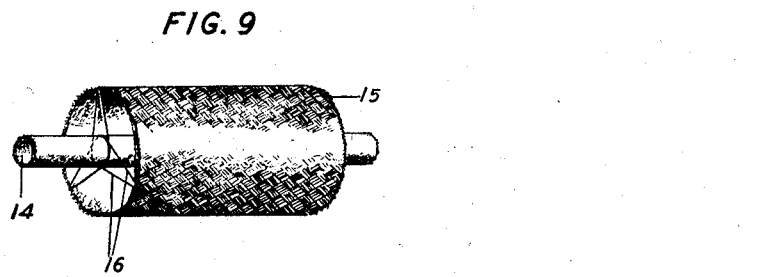

Fig. 9 of the drawings shows a pair of coaxial conductors 14 and 15 having a braided wire construction and held in spaced relation to each other by tension members 16. These members may consist of cord of some suitable textile material which may be braided into the structure along with the braided wire. The members serve to suspend the inner conductor 14 from the outer conductor 15 and at the same time possess low dielectric capacity, so that the space between the conductors contains substantially only air or any other gas used in the cable. The braiding of the wires is arranged to be symmetrical about a line parallel to the axis of the conductor. The advantage of braiding resides in the fact that a high degree of flexibility and strength may be obtained by such structure.

Cables in accordance with the present invention may be laid in conduits, embedded in the soil or hung on poles. If the outer conductor of a pair is water-proof no precautions need be taken to insulate the outer conductor against moisture.

While this invention has been described in certain particular embodiments for the purpose of illustration, it is to be clearly understood that other widely varied organizations may be utilized without departing from the spirit of the invention and the scope of the appended claims.

What is claimed is:

1. A multi-circuit cable for use in high frequency transmission of intelligence comprising a plurality of pairs of coaxial conductors, each pair comprising an outer tubular conductor a fraction of an inch in diameter and an inner conductor spaced in concentric relation therefrom, the space between said outer conductor and said inner conductor comprising substantially air dielectric, and means for maintaining said pairs in assemblage.

2. A cable according to claim 1, in which the outer tubular conductor of each pair is in direct conductive contact with the outer tubular conductor of an adjacent pair.

3. A multi-conductor cable for use in carrier transmission at high frequencies, comprising a plurality of pairs of coaxial conductors, each pair comprising a central conductor and a composite outer conducting tube coaxial therewith, the outer conducting tube of each of said pairs being in direct conductive contact with the outer conducting tube of an adjacent pair, and an overall water-proof sheath external of said pairs.

4. A multi-conductor cable for the transmission of carrier frequency signals comprising a plurality of pairs of coaxial conductors, the outer conductor of each of said pairs being composite and in substantially continuous mechanical contact with the outer conductors of adjacent pairs, and means to prevent penetration of moisture and foreign matter through said composite conductors, said means consisting of a water-proof covering common to all of said pairs.

5. A multi-circuit cable for the transmission of radio frequency carrier signals comprising a plurality of pairs of coaxial conductors, each of said pairs comprising a central conductor and a solid tubular conductor less than an inch in diameter separated from said central conductor by a dielectric that is chiefly gaseous, said conductors being proportioned to permit flexing of said cable, and a sheath binding said plurality of pairs together.

6. In a system for the transmission of radio frequency carrier telephone signals, a flexible multi-circuit cable comprising a plurality of pairs of coaxial conductors laid with their outer conductors in electrical contact with each other, the dielectric separating the conductors of each of said pairs being substantially gaseous and the outer conductor of each of said pairs being of cylindrical form and less than an inch in diameter, and a sheath surrounding said plurality of pairs.

7. A multi-circuit cable for the transmission of intelligence at high frequencies comprising a plurality of pairs of coaxial conductors, said conductors being arranged with their outer conductors in substantially continuous mechanical and electrical contact.

HOMER W. DUDLEY.